United States Patent
Buck, Jr.

(10) Patent No.: US 12,535,582 B1
(45) Date of Patent: Jan. 27, 2026

(54) SCALABLE ARBITRARY OPTICAL WAVEFORM GENERATION

(71) Applicant: Lockheed Martin Corporation, Bethesda, MD (US)

(72) Inventor: Joseph Robert Buck, Jr., Superior, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 933 days.

(21) Appl. No.: 17/740,606

(22) Filed: May 10, 2022

(51) Int. Cl.
| | |
|---|---|
| G01S 3/00 | (2006.01) |
| G01S 7/4911 | (2020.01) |
| G01S 17/34 | (2020.01) |
| G01S 17/58 | (2006.01) |
| H04B 10/50 | (2013.01) |

(52) U.S. Cl.
CPC ............ G01S 17/34 (2020.01); G01S 7/4911 (2013.01); G01S 17/58 (2013.01); H04B 10/505 (2013.01)

(58) Field of Classification Search
CPC ........ G01S 17/34; G01S 17/53; G01S 7/4911; H04B 10/505
See application file for complete search history.

(56) References Cited

U.S. PATENT DOCUMENTS

| 11,175,563 B2 * | 11/2021 | Wong ............... G02F 1/365 |
| 2012/0106579 A1 * | 5/2012 | Roos ............... H01S 5/0683 |
| | | 372/20 |

FOREIGN PATENT DOCUMENTS

| CN | 103762486 A | * | 4/2014 | ............ H01S 3/067 |
| KR | 2022044012 A | * | 4/2022 | ............ G02B 6/122 |

OTHER PUBLICATIONS

De Chatellus, Hugues Guillet et al., "Reconfigurable Photonic Generation of Broadband Chirped Waveforms Using a Single CW Laser and Low-Frequency Electronics," Nature Communications, 12 pages, 2018.

* cited by examiner

Primary Examiner — Mark Hellner

(57) ABSTRACT

The examples herein provide enhanced optical architectures employing techniques and systems for scaling up a signal bandwidth and correcting errors in optical signals to achieve a corrected waveform that can be adjusted for the desired application with broad tuning of bandwidth, chirp rate, chirp duration and symmetry. An optical signal is provided for circulation in an optical loop, and incremental modulations are applied to the optical signal over a quantity of circulations to establish circulating waveforms that form a composite waveform. Detected errors in the circulating waveforms can be corrected during the incremental modulations. In some instances, a portion of the optical signal comprising the composite waveform can then be directed for emission toward a remote target and remote sensing of properties of the remote target.

20 Claims, 9 Drawing Sheets

SCALABLE ARBITRARY OPTICAL WAVEFORM GENERATION

TECHNICAL BACKGROUND

Modulated laser devices can be deployed for remote sensing applications, such as LiDAR or LADAR (light/laser detection and ranging), which can be useful for ranging, vibrometry, aperture synthesis, and 3D imaging. However, most modulated laser devices cannot meet all requirements for targeted sensing applications simultaneously. Usually only a subset of characteristics among many characteristics are optimized in modulated laser devices, with some characteristics being unable to be effectively tuned while the others are constrained. These characteristics can include stability (narrow linewidth), bandwidth (large/wide), and tunability (rapid). In general, stable lasers are not rapidly tunable and rapidly tunable lasers are not generally stable nor exhibit low phase noise. An example modulated laser device might directly modulate a tunable laser and then implement error correction both in hardware and software in order to get closer to a desired waveform, such as a linear chirp used in raging applications. However, these architectures have severe limitations on the achievable chirp rates and in the noise characteristics from the initial laser source. Thus, the laser tuning characteristics provide performance limitations on the achievable waveforms.

OVERVIEW

The examples herein provide an enhanced optical architecture employing techniques and systems for scaling up a signal bandwidth and correcting errors to achieve a corrected waveform that can be adjusted for the desired application with broad tuning of bandwidth, chirp rate, chirp duration and symmetry. This enhanced optical architecture can provide a very compact arrangement that is suitable for implementation on a satellite or photonic integrated circuit. In many examples, once a waveform or series of waveforms have been established and corrected within an amplifier-assisted optical loop, a portion of an optical signal comprising the waveforms can be emitted for various purposes. These purposes include ranging or remote sensing of remote objects, targets, or regions of interest. A detection element can receive reflected waveforms and perform various processing or comparisons to determine distances to objects or other properties of targets/regions.

In one example implementation, a method includes providing an optical signal for circulation in an optical loop, and applying incremental modulations to the optical signal over a quantity of circulations to establish circulating waveforms that form a composite waveform. The method includes correcting at least a portion of errors in the circulating waveforms during the incremental modulations, and directing at least a portion of the optical signal comprising the composite waveform for emission toward a remote target.

In another example implementation, an apparatus includes an optical source configured to provide an optical signal for circulation in an optical loop, and an optical amplification element configured to maintain at least a minimum target amplitude of the optical signal during circulation in the optical loop. A modulator element is configured to apply incremental modulations to the optical signal over a quantity of circulations to establish circulating waveforms that form a composite waveform. Error detection elements are configured to monitor the circulating waveforms, where at least a portion of detected errors are corrected by the modulator element during the incremental modulations. An output arrangement is configured to receive at least a portion of the optical signal comprising the composite waveform for emission toward a remote target.

In yet another example, a control system for an optical architecture is provided. The control system includes an input module configured to receive an indication of a waveform for generation. A controller is configured to determine incremental modulations applied to an optical signal over a quantity of circulations in an optical loop to establish the waveform. The controller is configured to receive indications of errors in the optical signal and determine corrections for the incremental modulations based on the errors. The controller is configured to instruct an optical modulator to establish the waveform over the quantity of circulations based on the incremental modulations and the corrections.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The examples herein describe enhanced optical architectures that produce optical signals having selectable waveforms, such as transform limited linear chirps employed in ranging and remote sensing applications. Large signal bandwidths can be produced with precise control of the phase throughout the waveform. For example, a rapid sequence of repeated and transform limited linear frequency chirps can be established to allow long range measurements. Being transform limited is a desirable quality and refers to a pulse of a waveform that has a minimum possible duration for a given spectral bandwidth. This architecture allows a very compact arrangement suitable for many LADAR applications including ranging, compressive sensing, and optical aperture synthesis. Due to this compact arrangement, the elements discussed herein can be incorporated into satellites, spacecraft, vehicles, mobile devices, and can also be integrated into a photonic integrated circuit.

To achieve such operations, an optical loop or feedback arrangement can be employed. The arrangement includes an optical modulator coupled to an in-loop re-amplification or recycling element and selectable delay elements. This optical loop can be configured to circulate an optical signal having various modulated waveforms that are built up over more than one circulation in the optical loop. An optical modulator implements incremental modulations over time, employing enhanced techniques for scaling up a signal bandwidth and correcting errors to achieve a corrected waveform that can be adjusted for the desired application with broad tuning of bandwidth, chirp rate, chirp duration and symmetry. In many applications, the included examples can produce optical chirps having transform limited pulses, long coherence lengths, and rapid frequency tuning on both the up and down chirps.

Once a target repeating waveform or optical signal, such as a chirp or train of chirps, is produced in the optical loop structure, then an output section or stub can take at least a portion of the optical signal for emission towards a target object or target region of interest. Based on the reflected properties of the emitted optical signal, various characteristics can be determined for the remote object or region. These include properties determined from ranging, vibrometry, laser doppler vibrometer (LDV) measurements, aperture synthesis, and 3D imaging activities. Advantageously, high bandwidth signals can be established in a short pulse. The emitted/reflected signals can wrap instances within the optical loop to compare emitted/received signals to perform ranging across a spread of distances, such as simultaneous ranging over near and far distances.

Figure 1:
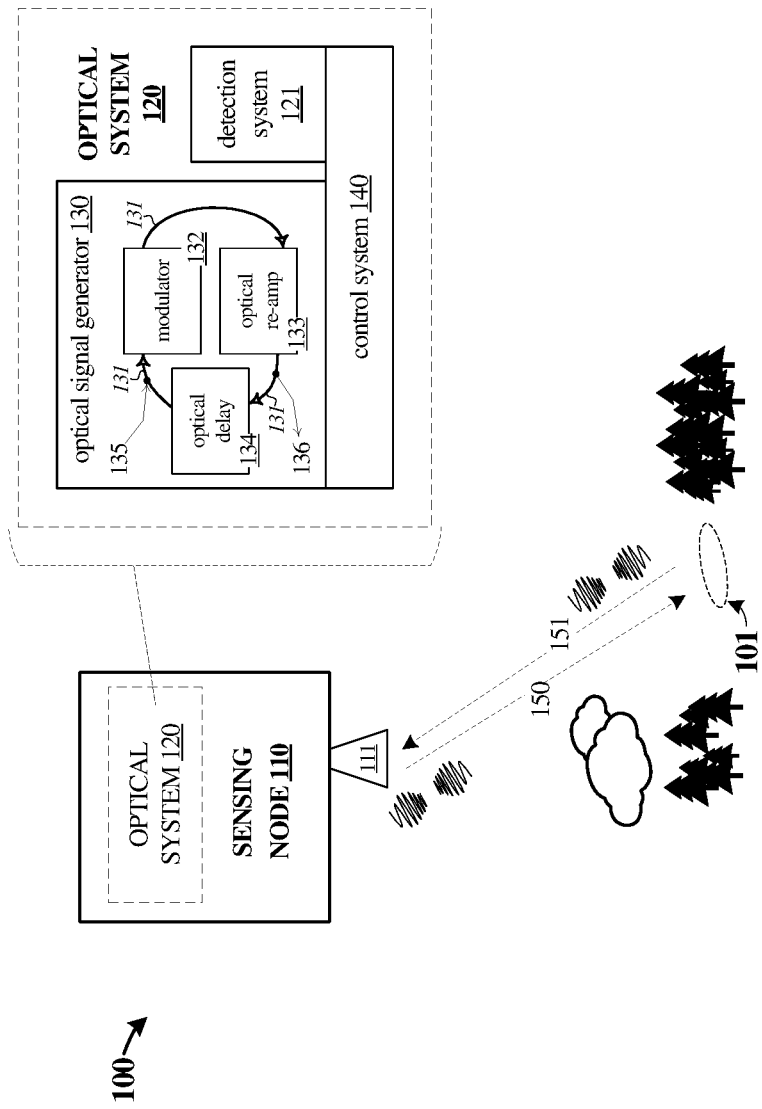
FIG. 1 illustrates a sensing node in an implementation.

Turning now to a first example implementation, FIG. 1 is presented. FIG. 1 includes system 100 comprising sensing node 110 and remote target 101. Sensing node 110 includes optics 111 and optical system 120. Optical system 120 comprises optical signal generator 130, detection system 121, and control system 140. FIG. 1 shows one example application for optical system 120, namely remote sensing of properties of remote target 101. Optical link 150 is an exemplary free space optical emission towards remote target 101, while optical link 151 is an exemplary free space optical reflection by remote target 101 towards sensing node 110. It should be understood that the configuration of links 150-151 are merely shown for clarity in this example, and this configuration can vary in other examples. FIG. 1 also shows chirp signals transiting links 150-151, which represent one example waveform configuration.

Optical signal generator 130 includes optical loop 131 comprising one or more optical fibers or optical waveguides, and has several elements positioned along the loop. These elements include modulator 132, optical re-amplifier 133, and optical delay 134. Input optical signal 135 and output optical signal 136 for optical loop 131 are also shown. In operation, a source optical signal is introduced as input optical signal 135 which then circulates in optical loop 131. Re-amplification of the circulating optical signal is achieved via optical re-amp module 133, and any desired signal delays can be implemented using optical delay module 134. Incremental modulations are applied to the circulating optical signal by modulator 132. Once a desired waveform or series of waveforms is achieved in optical loop 131, then output optical signal 136 is shown as directing at least a portion of the circulating optical signal for emission. Optical delay module 134 can be employed to overlay or superimpose circulating waveforms to establish a desired target waveform or series of waveforms. Corrections can be applied to the circulating optical signal using combinations of modulator 132 and optical delay module 134, such as for correction of errors or noise in the circulating or re-amplified signal.

To perform the various signal modulation and correction operations, control system 140 is provided. Control system 140 can receive indications of the optical signal within optical loop 131, determine incremental modulations or corrections to be applied using additional modulation, and instruct modulator 132 to produce such incremental modulations or corrections on optical signals in optical loop 131. Control system 140 might receive the aforementioned indications via electro-optical elements that detect portions of the optical signal in optical loop 131 and convert into an electrical or digital format. In some examples, modulator 132 can receive control instructions from control system 140 in a digital or electrical format for modulation of an optical signal in an optical format. Control system 140 can also control operation of optical delay module 134 and optical re-amp module 133, optics 111, and other elements of sensing node 110. When remote sensing operations are performed, control system 140 can provide for determination of the sensed characteristics of remote target 101 in conjunction with detection system 121. Control system 140 can also interface with external systems (not shown) to receive commands/instructions or to provide results of remote sensing operations. Control system 140 might include various network interfaces, data interfaces, user interfaces, radio frequency (RF) interfaces, optical interfaces, and other similar elements. Control system 140 can further be formed from various control electronics or circuitry, including data processors, memory devices, data storage devices, communication interfaces, integrated circuit devices, and other similar components.

Modulator 132 comprises an electrically controlled optical modulator. Modulator 132 includes various optical modulation elements, which may receive commands or control indications over an electrical interface from control system 140. Modulator 132 can comprise phase modulators which inject changes to an optical signal in optical loop 131 using phase adjustments. In this context, the phase adjustments correspond to the integral of the needed frequency adjustments, where frequency is the time derivative of the phase. Modulator 132 can produce modulations in quadratic phase, where the modulations include incremental changes to an existing signal within optical loop 131. Modulator 132 typically has a limited phase excursion, such as 20 radians. However, to achieve a linear chirp waveform bandwidth of 100 GHz, for example, the phase modulations are incrementally applied over time. The waveform bandwidth can correspond to range resolution on measurements of target objects, for use in high resolution LADAR. Thus, when a linear frequency chirp is desired to be produced in optical loop 131, modulator 132 can add up small signal phase modulation excursions over time within optical loop 131. Once the desired signal is established in optical loop 131, various corrections can be made to the signal or the corresponding waveforms. These corrections, or error corrections, can produce stable, reduced noise, and phase corrected waveforms.

Various sensing elements (not shown) can be included in optical loop 131 to measure different errors or noise properties, such as wobble/jitter, ramp/slope errors, amplifier noise contributions, errors in base frequencies of optical sources, among other error or noise sources. However, noise and other errors can be additive from many circulations in optical loop 131, thus it is desirable to remove or reduce these errors once a target waveform bandwidth achieved. Some phase errors or inter-waveform gap variation can be corrected using adjustable optical delay element 134, and frequency errors can be corrected by modifying the waveform itself using modulator 132. Large phase offsets can be corrected by making physical changes to optical re-amp 133 or an optical source, such as diode or laser temperature control or current control to center the output.

Optical re-amp module 133 can comprise a coated laser diode cavity. Operation of re-amp module 133 provides for recycling of the optical signal within optical loop 131, such as by providing an injection mode seeding of a diode laser to act as amplifier of an injected signal.

Optical delay element 134 comprises a selectable or variable delay within optical loop 131. Optical delay element 134 can comprise optical delay lines, such an optical fiber delay lines or waveguide delay lines, special optical meta-materials which slow transiting light, or other components, along with selectable delay switching elements and command interfaces. The delays can ensure additive contributions of modulator 132 to existing waveforms in optical loop 131, which can overlay new incremental modulations onto existing waveform to achieve desired signal bandwidths. This is accomplished by multiple passes through optical loop 131, with appropriate delays, to add higher and higher frequency content to the optical signal. The range of delay variability might enable 100 ns to 1 μs chirp durations.

Detection system 121 comprises both emission and detection elements for performing ranging operations and remote sensing operations. Detection system 121 converts incident optical signals to electrical or digital representations. Detection system 121 includes optical detectors, such as imaging sensors (CMOS or CCD), photomultiplier elements, optical avalanche sensors, or other optical detections. Various wavelength filtering or polarization elements can be included to reject noise and influence of unwanted signals. Detection system 121 may include elements of optics 111. In ranging operations, detection system 121 includes optical comparator or mixing elements, which might occur in the optical domain or electrical/digital domain. Detection system 121 might obtain a present optical signal in optical loop 131 and compare to reflected light received from a distant object, and mix the present optical signal and the reflected light signal together to determine velocity, range, other parameters of the distant object. Information relating this distance or other ranging/sensing properties can be provided over various interfacing elements, such as various communication interfaces or network interfaces.

Optics 111 include various optic elements and associated structures, including optical focusing elements, collimators, mirrors, deformable optical elements, micro-electromechanical elements, aiming/pointing systems, and similar elements. Optics 111 can include portions of optical communication equipment which include optical receivers/detectors, optical fibers, optical waveguides, modulators, beam pointing/aiming equipment, and other similar equipment. Optics 111 can interface with elements of optical system 120, such as detection system 121 and link 136 to transmit and receive optical signals over free space, optical fiber, or optical waveguide elements. Optics 111 may include electro-optical elements to convert signals between optical formats and electrical formats, and vice versa.

Figure 2:
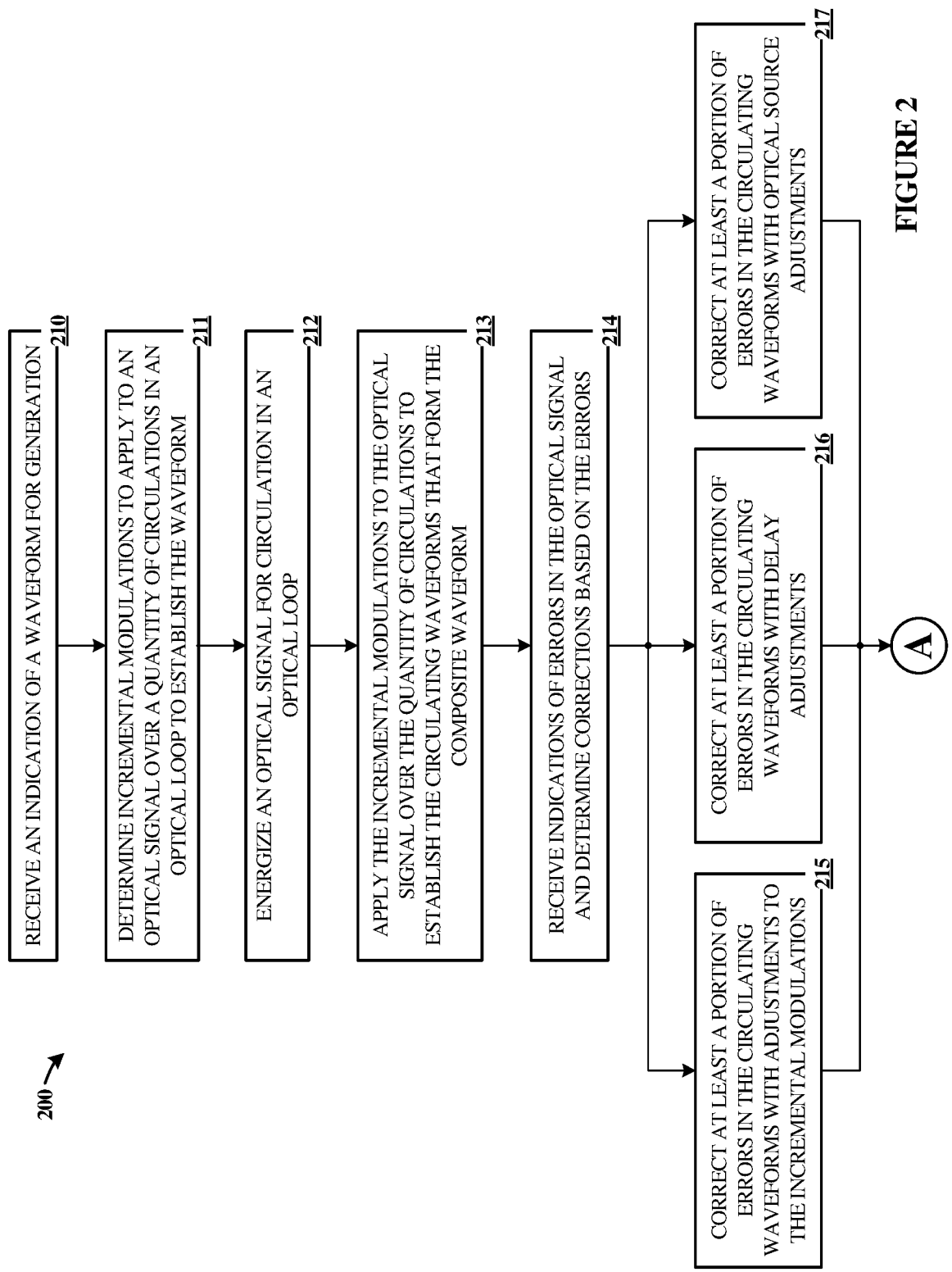
FIG. 2 illustrates operations of a sensing node in an implementation.
Figure 3:
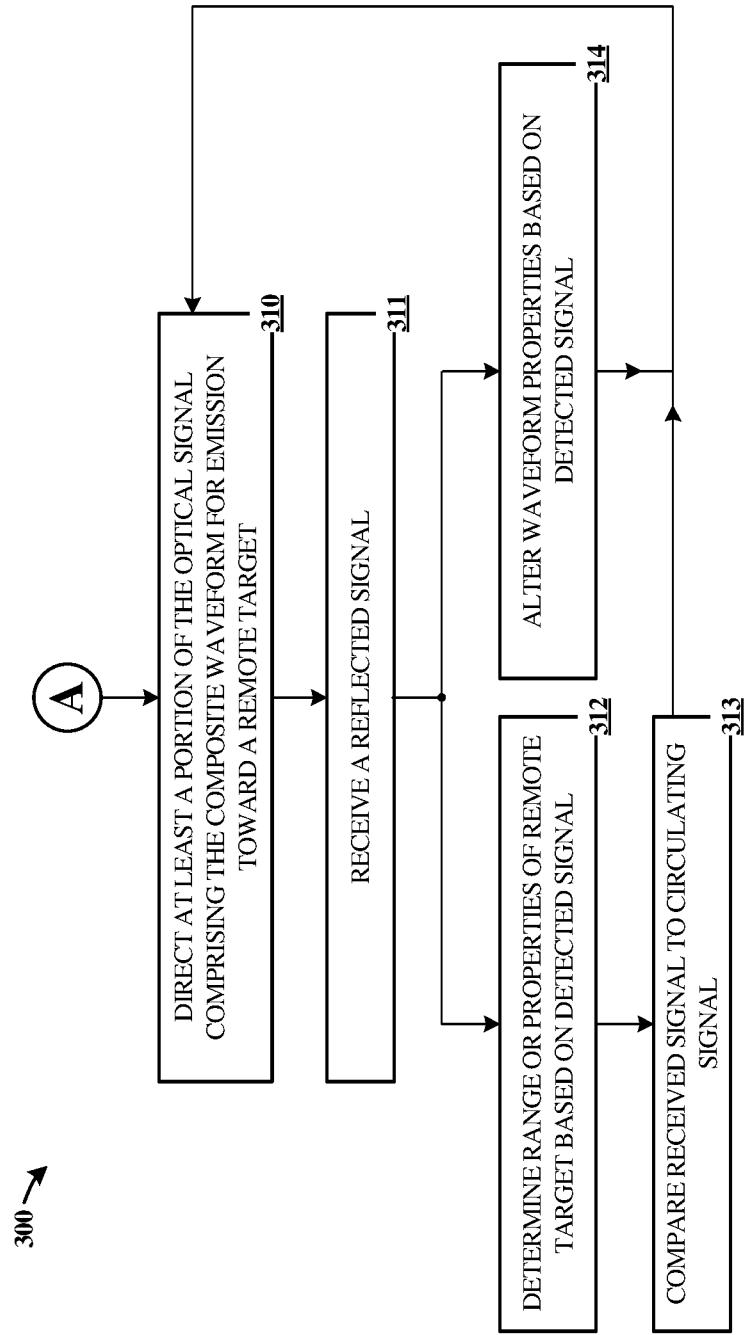
FIG. 3 illustrates operations of a sensing node in an implementation.

Turning now to example operations of system 100, FIGS. 2 and 3 are provided. FIG. 2 includes various waveform generation operations 200. FIG. 3 includes various remote sensing operations 300. Although the operations of FIGS. 2 and 3 are discussed below in the context of the elements of FIG. 1, it should be understood that these operations can be applied to other systems and elements, such as those in the subsequent Figures, including variations thereof. Also, although the operations of FIG. 2 can be applied to those of FIG. 3, it should be understood that the operation of FIG. 2 can stand alone to provide arbitrary optical waveform generation, useful for many applications other than remote sensing.

In operation 210, control system 140 obtains an indication of a waveform for generation. This indication can include target specifications for the waveform, such as waveform type, target frequency, phase, or ramp characteristics, as well as quantity of instances of waveforms when forming a series or train of waveforms. The waveforms can comprise repeating waveforms, such as linear chirps. Two or more chirp ramps might be specified within a sequence of chirps, such as for discriminating distance ambiguities during remote sensing. Other repeating waveforms can be specified, such as square, triangle, sinusoid, quasi-sinusoid, or any arbitrary waveform that can be defined in either a time domain or frequency domain.

From the specification of the waveform, control system 140 determines (211) incremental modulations to apply via modulator 132 to an optical signal over an iterative quantity of circulations in an optical loop that establish the waveform. The incremental modulations can include modulations determined in quadrature for injection into optical loop 131 by modulation of the optical energy or optical signals transiting optical loop 131. Before the modulations can occur, however, an initial optical signal is energized (212) for circulation in optical loop 131. In FIG. 1, an optical source (not shown) can energize a continuous wave (CW) optical signal having a particular frequency or wavelength and amplitude over link 135 and into optical loop 131. Modulator 132 can then apply (213) the incremental modulations to the optical signal over a quantity of circulations to establish the circulating waveforms that form a composite waveform to attempt to meet the specification in operation 210. The actual quantity of circulations needed to establish the composite waveform can vary based on the magnitude of incremental modulations feasible by modulator 132, the specified waveform complexity, bandwidth, and associated high-frequency content, and other factors. In one example, the quantity of circulations, N, is N $$N \approx \frac{\pi B \tau_C}{\Delta},$$

where B is the desired signal bandwidth, $\tau_C$ is the chirp time (in the case of chirp waveforms), and $\Delta$ is an indication of the modulation capability per iteration for the modulator.

During circulation within optical loop 131, the amplitude and phase of the optical signal may require adjustments to produce the desired composite waveform. For example, optical loop 131 can comprise an optical fiber or set of optical fibers or waveguides, and the energy of the optical signal can attenuate over time due to natural effects of propagation within a material. Optical re-amplifier 133 can re-amplify this optical signal to overcome the signal attenuation and restore a desired minimum target amplitude. Optical re-amp 133 might comprise an injection mode device which amplifies any signal injected into a resonant cavity structure and thus amplifies the incident optical signal. Also, while the optical loop length might be tuned specifically to suit a certain waveform and certain incremental modulations, a more flexible approach is employed herein. Adjustable optical delays can be established by optical delay module 134. These adjustable optical delays can alter phase properties of the circulating signal or delay the signal entirely such that the incremental modulations applied by modulator 132 can affect the appropriate portion of the circulating waveform. This can establish additive or subtractive influence onto the circulating waveforms for the newly applied modulations for each iteration of the incremental modulations. From the applied modulations and delays, a composite waveform (or waveforms) is established in optical loop 131.

Also, even with precision modulation, precision optical sources and amplifiers, and other precision optical elements within optical loop 131, errors and noise can arise naturally and from the operation of active components. Modulator 132 can correct for many of these errors, with further errors correctable using adjustable delays of optical delay module 134 and long-term changes to optical re-amp 133 and an optical source. In one example, control system 140 receives (214) indications of errors in the optical signal and determine corrections based on the errors. The indications can be obtained from one or more sensors configured to detect different properties of the circulating waveforms in optical loop 131. A first error type can include "in loop" errors of ramp or slope of the waveform. Sensors can measure error using a delay differential between two sub-branches of optical loop 131 (i.e. the signal mixed with itself) to determine slope of the waveform based on delay and frequency, with extra frequency offsets introduced to aid measurement using an acousto-optical amplifier to move away from noisy frequency regimes and provide larger feedback bandwidths for error correction. A second error type can include noise from optical amplifiers, such as optical re-amp 133 or other output amplifiers (not shown) which affect waveforms with non-linear effects. Sensors can be configured to measure a present waveform, and control system 140 can compare this present waveform against an ideal waveform specification to determine noise as a remainder from the comparison. An inverse signal can be determined of this noise, and control system 140 can instruct modulator 132 to apply this inverse signal to the circulating waveform to cancel the detected noise. A third error type can include errors in the base CW frequency of source optical signal, such as from a laser source or optical re-amp 133. Slow drifts in frequency and phase due to temperature and environmental conditions can cause a natural drift. Control system 140 can receive indications of the frequency and phase of the circulating waveform and use phase differences to remove amplifier noise. These phase differences can be compensated using optical delay module 134 for a given range of phase differences. Phase differences outside of that range can be made by modifying operating parameters of the optical source or other sources of the third error type. These operating parameters can include electrical current or operating temperature.

Once control system 140 determines the errors and appropriate corrections, then control system 140 can instruct modulator 132, optical delay 134, or other elements associated with optical loop 131 to correct these errors. Modulator 132 corrects (215) at least a first portion of the errors in the circulating waveforms with adjustments to the incremental modulations. Optical delay module 134 corrects (216) at least a second portion of errors in the circulating waveforms with delay adjustments. Control system 140 corrects (217) at least a third portion of errors in the circulating waveforms with optical source operating adjustments.

Once the composite waveform or composite waveforms have been established within optical loop 131, and any desired corrections made, then the waveforms are considered suitable for downstream use, such as for remote sensing or other applications. Jump point 'A' in FIG. 2 leads to FIG. 3 which discusses remote sensing applications in operations 300. Remote sensing, as discussed herein, employs the use of linear chirp signals to determine properties of remote objects or targets, such as a distance.

Detection system 121 directs (310) at least a portion of the optical signal comprising the composite waveform for emission toward a remote target. In FIG. 1, link 136 represents an output stub or output arrangement of optical loop 131, which might include various shutter mechanisms, microelectromechanical system (MEMS) optical switching devices, optical splitters, optical amplifiers, and optics to direct at least part of the circulating waveforms to optics 111 and ultimately for emission by sensing node 110. In this example, sensing node 110 emits a series of waveforms (indicates as chirps) toward remote target 101 over representative optical link 150. In operation 311, reflections or refractions by remote target 101 of the chirps are detected (represented by optical link 151) by detection system 121.

Detection system 121 can then determine (312) a range or properties of remote target 101 based on the detected signal after at least partial reflection by the remote target. One example process to determine the range or properties of remote target 101 is to store a portion of the emitted waveform in an optical loop (separate than optical loop 131) long enough to be able to compare the stored waveform with the reflected waveform. A comparison in the waveforms can reveal a range/distance or other properties of remote target 101. However, due to optical loop 131 and the enhanced techniques for generating waveforms therein, a storage loop need not be employed. Instead, detection system 121 can count the number of chirps elapsed in optical loop 131 between emission and detection. The signal quality within optical loop 131 can be of such high quality, that a comparison (313) between present waveforms and reflected waveforms can be sufficient without comparing to a stored copy of the emitted waveform.

However, there are instances where the ranging or sensing leads to no results, ambiguous results, or results which require better resolution than an initial sensing burst. Detection system 121 can repeat the measurement which may include altering (314) waveform properties based on the detected signal to achieve better sensing results. Better resolution may be achieved using the aforementioned techniques by using discrete bursts of chirps or alternatively using different chirp ramps in real-time to discriminate between chirp emitted and reflected instances. This can also be useful when clutter objects lie between sensing node 110 and remote target 101, or when an estimated range to the target exceeds a range threshold supported by the current waveform or waveform configuration. For example, detection system 121 can instruct modulator 132 to apply the incremental modulations such that more than one different composite waveform is circulating in optical loop 131. Specifically, a first chirp waveform might have a first ramp rate which is interspersed with a second chirp waveform having a second ramp rate. A comparison among the detected chirp waveforms and the presently circulating waveforms can be made, which might be better able to discriminate distances when multiple waveforms are employed. Further examples along these lines are described in FIG. 7 below.

Advantageously, corrections to waveforms in optical loop 131 can be applied on successive modulations of the waveforms. Using such techniques, ramp rates for linear chirps can be adjusted over several orders-of-magnitude, and chirp duration can be matched to the range of interest. Regions of interest can be wrapped to different orders in a sequence of chirps, with a dithered chirp sequence applied to overcome range ambiguity intervals. The incremental modulations applied over time, in combination with a stable optical source, can introduce successive phase changes to build up large signal bandwidths. This can advantageously provide transform-limited waveforms, along with a broad range of arbitrary waveform types. The operations described above simultaneously provide both large signal bandwidths and excellent phase stability, and allow a broad range of waveform characteristics. The range of waveform characteristics can be limited by properties of the optical re-amp module 133, such as a diode cavity chirp rate injection seeding. However, this architecture is compact and suitable for deployment on orbital satellites or integration in a photonic integrated circuit. The waveforms can be easily switched from suitability for long ranges to short ranges in a continuous tuning. There are several LADAR architectures that benefit from this architecture, including compact 3D optical aperture synthesis architectures. This allows waveforms well suited to long range applications for sensing, imaging, and vibrometry.

Figure 4:
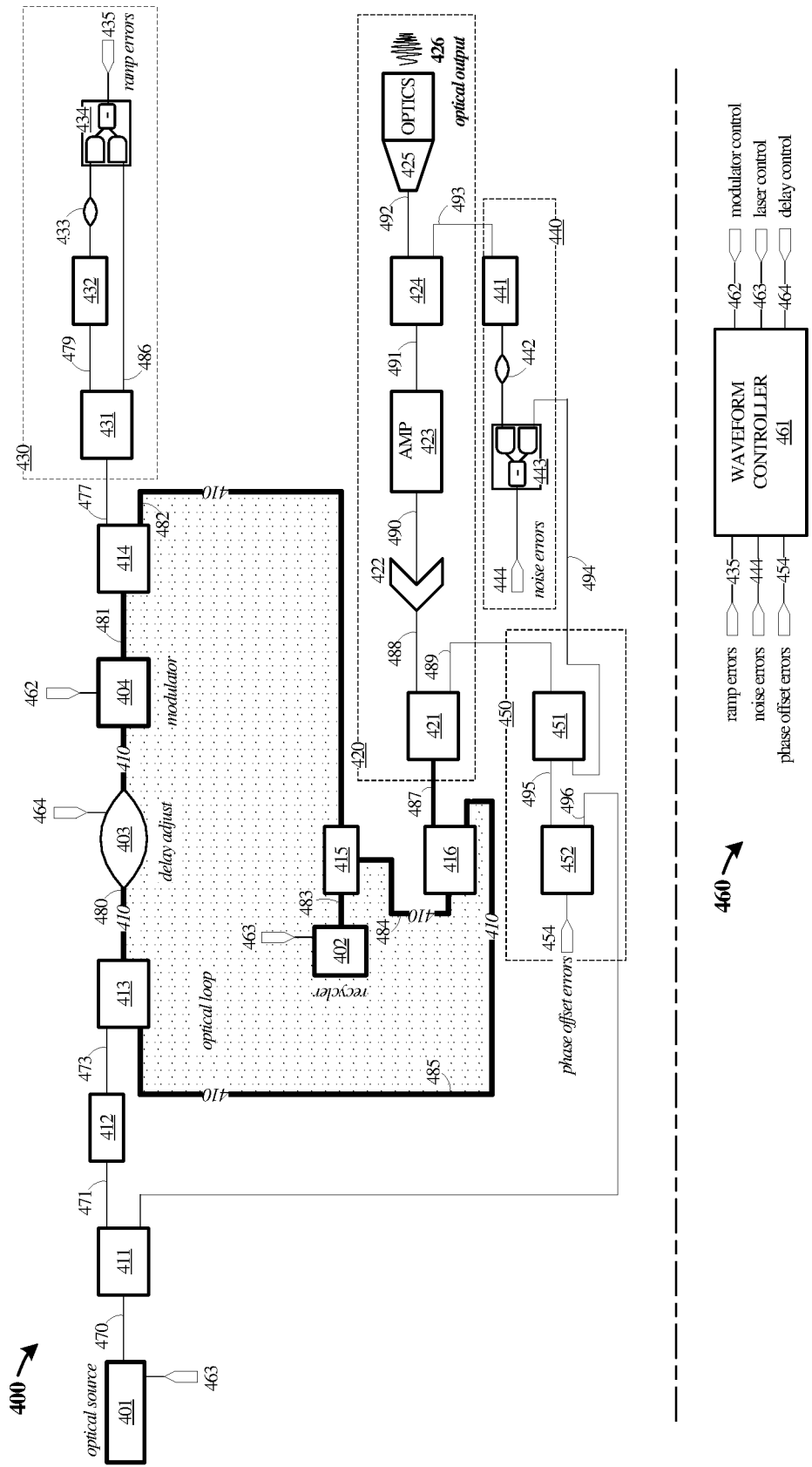
FIG. 4 illustrates detailed components of a sensing node in an implementation.

FIG. 4 describes a detailed implementation of an optical loop configuration in system 400. System 400 can be an example of elements of optical system 120 and optical loop 131 in FIG. 1, although variations are possible. System 400 includes a central optical loop 410 formed from optical links 480-485, and waveform controller 461 shown in view 460 which controls the various operations of elements of system 400. An output unit 420 is provided to transfer an optical signal and corresponding waveforms to suit the chosen application, such as remote sensing or ranging applications. Various error detection units 440, 440, and 450 are included to monitor, detect, and indicate various errors for the optical signals and waveforms within optical loop 410. Each of the error detection units includes a corresponding structure that produces an electrical or digital error signal based on optical inputs. This arrangement can be used to calculate target characteristics easier, such as amplitude and phase. One or more among error detection units 440, 440, and 450 can employ a balanced detection system. In such cases, a 50-50 splitter and subtraction from two detectors allows all of the associated light to be used for measurement while suppressing the amplitude noise from the signals. The resulting signal is then compared to the desired signal through a comparator (either in software or with RF comparators) to determine the error signal.

In operation, an optical signal circulates in optical loop 410 and receives incremental modulations from modulator 404. These incremental modulations produce an increasing signal bandwidth over time to form a desired waveform or series of waveforms. Delay adjustment module 403 can ensure that each repeating instance of the waveform is aligned with the incremental modulations to provide for additive modulations. Once a desired waveform characteristic, such as bandwidth, is achieved, then corrections can be applied to the waveform(s) to correct for noise, non-linearities, jitter/wobble, phase errors, frequency errors, inter-waveform spacing, or other errors. Error detection units 430, 440, and 450 each provide for measurement and characterization of a particular set of errors. These errors are provided to waveform controller 461 for determination of corrective actions to control various elements associated with optical loop 410.

Turning now to a detailed step-though explanation of the elements of FIG. 4, optical source 401 generates a stable continuous wave (CW) optical signal having a narrow linewidth (width of optical spectrum). Optical source 401 typically comprises a laser device that generates an optical signal at a given wavelength or frequency, and outputs the optical signal over optical link 470 to optical splitter 411. A first output leg of optical splitter 411 feeds link 471 and a second output leg of optical splitter 411 feeds into error detection unit 450 (which will be discussed below). Link 471 feeds variable optical attenuator (VOA) 412 which provides the optical signal over link 473 to optical combiner 413 to enter optical loop 410. VOA 412 can make adjustments to the amplitude of the optical signal as needed (and controlled by waveform controller 461) to suit the requirements of optical loop 410, such as when optical source 401 has an output amplitude different than desired for optical loop 410. Optical combiner 413 also takes as input the feedback or recycled portion of optical loop 410 at link 485.

From here, the optical signal in optical loop 410 reaches delay adjustment module 403 over link 480 which can apply a variable and selectable delay onto the optical signal according to control instructions received at node 464 from waveform controller 461. Optical phase modulator 404 is included in optical loop 410 to apply incremental or iterative modulations in quadrature to the optical signal in optical loop 410. A further explanation of the operation of modulator 404 is described below and in FIG. 5. Modulator 404 is controlled over node 462 by waveform controller 461. Modulator injects phase modulations (e.g., the derivative of frequency) into optical loop 410 to achieve a desired bandwidth in waveforms comprising the optical signal. While the phase excursions of modulator 404 might be slower than required to achieve a desired bandwidth in one pass (such as 20 radians), the desired bandwidth (such as 100 GHz) can be achieved over time using a quantity of iterations each applied to a cycle or circulation of the optical signal through optical loop 410. Once the incremental modulations have been applied, the optical signal is carried over link 481 to optical splitter 414. Optical splitter 414 provides a portion of the optical signal over link 477 to error detection unit 430.

Continuing the discussion of optical loop 410, optical splitter 414 provides a second portion of the optical signal over link 482 to a faraday circulator structure formed from optical splitter/combiner 415 and injected amplifier 402. Injected amplifier 402 can comprise an end-face coated laser diode having a cavity structure acting as an injected amplifier with the optical signal received over link 483 as the injected signal. Injected amplifier 402 recycles or re-amplifies the optical signal to ensure signal circulation within optical loop while maintaining a desired minimum target amplitude over time to overcome natural optical attenuation in optical loop 410 and amplitude reductions from the various inline splitter elements. The amplified signal is provided over link 484 by optical splitter 415 to another optical splitter 416. Optical splitter 416 provides a first portion of the optical signal over link 485 for feedback into optical splitter 413 and optical loop 410, and a second portion of the optical signal over link 487 to output unit 420.

Output unit 420 provides for extracting at least a portion of the optical signal in optical loop 410 for use external to the optical loop. This portion of the optical signal from optical loop 410 is referred to as an output signal. The external uses of the output signal can include a variety of applications, such as for use by measurement apparatuses, experimental apparatuses, ranging or remote sensing activities, and in some cases communication, although communications typically do not employ repeating waveforms. Optical splitter 421 provides a first portion of the output signal over link 488 to optical shutter 422, and a second portion of the output signal over link 489 to error detection unit 450. Optical shutter 422 can carve up individual pulses of the output signal or turn off the output signal entirely between pulses. Optical shutter 422 can include various shutter mechanisms, MEMS-based shutters or mirror redirectors, LCD shutters, or other forms of controllable shutters. Link 490 carries the remainder of the output signal to amplifier 423 which amplifies the remainder of the output signal for emission from system 400. However, before emission, a further splitter 424 is provided which provides a portion of the amplified remainder to error detection unit 440, and another portion to optics 425 over link 492. Optics 492 can comprise lenses, mirrors, filters, beam pointing mechanisms, or other optic elements. Optics 492 can condition, collimate, focus, point, direct, or otherwise handle emission of an optical signal from an optical fiber or waveguide into a free space environment or into another optical fiber or waveguide. Optical output 426 is shown comprising a chirp signal, which is representative of a waveform emitted by system 400.

As mentioned herein, a quantity of iterations or cycles of an optical signal through optical loop 410 is established such that incremental modulations can be applied by modulator 404 to establish a target waveform having a desired bandwidth. Once this target waveform or series of waveforms is established, then error corrections to that waveform can be made. The error corrections can be made concurrent with modulations to form the waveforms, or can occur after the waveform has been established. Error detection units 430, 440, and 450 sense various properties or characteristics of the circulating optical signal to determine errors introduced into the optical signals from various sources.

Turning first to error detection unit 430, a portion of the optical signal circulating in optical loop 410 is provided by splitter 414 over link 477 to optical splitter 431. Optical splitter 431 provides a first portion of the signal of link 477 to acousto-optic modulator (AOM) 432 and a second portion of the signal of link 477 to difference comparator 434. AOM 432 produces frequency offsets to combine the signal of link 477 with itself at difference comparator 434 after delay line 433. Difference comparator 434 comprises two electro-optical detectors and a comparator element to produce an electrical signal indicating a comparison result. Delay line 433 can be fixed or variable in delay magnitude, and controlled by waveform controller 461. An indication of ramp error (or signal wobble) is produced at node 435, and this indication is provided to waveform controller 461. AOM 432, sometimes referred to as a Bragg cell, helps in measurement of a slope at higher frequencies to avoid noise associated with lower frequencies. This ramp error can relate to errors in the ramp of the linear phase for chirp waveforms.

In error detection unit 440, a portion of an amplified version of an output signal is provided over link 493 to AOM 441. AOM 441 produces frequency offsets and provides this signal to delay line 442 and difference comparator 443. Difference comparator 443 comprises two electro-optical detectors and a comparator element to produce an electrical signal indicating a comparison result. Delay line 442 can be fixed or variable in delay magnitude, and controlled by waveform controller 461. A portion of the unamplified version of the output signal is provided via splitter 451 and link 494 to difference comparator 443. An indication of amplifier noise error (from amplifier 423) is produced at node 444, and this indication is provided to waveform controller 461. This amplifier noise is typically non-linear, and can be corrected with an inverse waveform applied to waveforms in optical loop 410 to cancel out such noise.

In error detection unit 450, a portion of the unamplified version of the output signal is provided over link 489 to splitter 451 which further provides a portion to link 495 and balanced detector element 452. Link 496 carries a portion of the input signal from splitter 411 to balanced detector element 452. Balanced detector element 452 can employ a combination of a 50-50 splitter with balanced path lengths to two detectors. The difference of the two outputs provides a desired signal which greatly reduces the amplitude noise. In this case, the desired signal is an indication of errors in the base frequency of optical source 401. Balanced detector element 452 thus can comprise two electro-optical detectors and a comparator element to produce an electrical signal indicating a comparison result provided to waveform controller 461. This comparison result relates to phase offset errors between the compared optical signals. Correction of phase errors among the phase offset errors can be achieved by varying the delays provided by delay adjustment module 403. Correction of frequency errors can be achieved by adjusting the waveform itself by modulator 404. These corrections can correct inter-waveform gaps as well. If the phase offset errors are too large or out of range, then the optical sources in FIG. 4 can be adjusted. Specifically, slow drifts in frequency and phase over time can be corrected using physical changes to the optical sources to center their outputs, such as temperature/thermal changes or current changes to alter the base frequency slightly. These optical sources can include optical source 401 as well as injected amplifier 402. Error detection unit 450 can have an inline AOM and delay line with one of the input arms to a difference comparator to perform quadrature measurements, as seen in other error units, but with stable sources this is not typically required.

Waveform controller 461, as shown in view 460, can receive indications of the various errors noted above, and compute corrections for the various errors. The corrections can take the form of control signals to alter phase delays or optical source operational properties, or the corrections may take the form of waveform corrections made via phase modulations applied by modulator 404 to alter the optical signal circulating in optical loop 410. Waveform controller 461 comprises one or more among data processors, digital signal processors, specialized processing units, programmable logic devices, application specific integrated circuitry, or other elements. Waveform controller 461 might comprise a microprocessor executing software which operates according to the above noted error correction techniques. Waveform controller 461 might receive error indications in one signal format and have circuitry or software to convert into another signal format. Waveform controller 461 might produce corrections in one signal format and have circuitry or software to convert to another signal format for interfacing with the elements of system 400. This circuitry can include analog-to-digital (A/D) conversion circuitry or digital-to-analog (D/A) conversion circuitry, electro-optical circuitry, and other circuitry. In some examples, Waveform controller 461 is represented by control system 140 of FIG. 1 or control system 901 of FIG. 9.

Links 470-496 can include one or more optical links, optical waveguides, optical fibers, or include segments transported over free space. Likewise, nodes 435, 444, 454 can comprise similar elements as links 470-496 or may instead comprise electrical links carrying digital signals or analog signal representations, and may include A/D conversion units or electro-optical conversion units. Notes 462, 463, 464 can comprise similar elements as nodes 435, 444, 454, and may include D/A conversion units.

Advantageously, the example arrangement shown in FIG. 4 that includes system 400 (e.g., waveform controller 461) can provide scalable waveform generation by applying waveform corrections in steady state waveform replication, as seeded by an initial loop phasing control. Various techniques for optimizing waveforms and tracking waveform offset errors, as well as other error feedback, are provided by the error detection units and waveform controller. As will be discussed below, system 400 can adapt the waveforms in optical loop 410 to ranges, and provide waveforms for multi-range implementations. In-loop control for waveform characteristics is provided by waveform controller 461, modulator 404, recycler 402, and delay adjustment module 403. Elements of system 400 can established as carving of pulses and setting overlap among pulses, which can be controlled to produce desired waveform outputs and sequential repeating waveforms for various applications. Example waveform characteristics can include linear chirp waveforms having a linewidth of 1 Hz, a bandwidth of 200 GHz, a modulation frequency of 2 MHz, and a ramp rate of $10^{17}$ Hz/second.

Turning now to FIGS. 5-8, example waveforms surrounding the operation of the aforementioned architectures and techniques are shown. The waveforms of FIGS. 5-8 might be generated by system 100 or system 400, although variations are possible. Also, although FIGS. 5-8 are discussed in the context of the elements of FIG. 4, it should be understood that similar elements of FIG. 1 can be employed.

Figure 5:
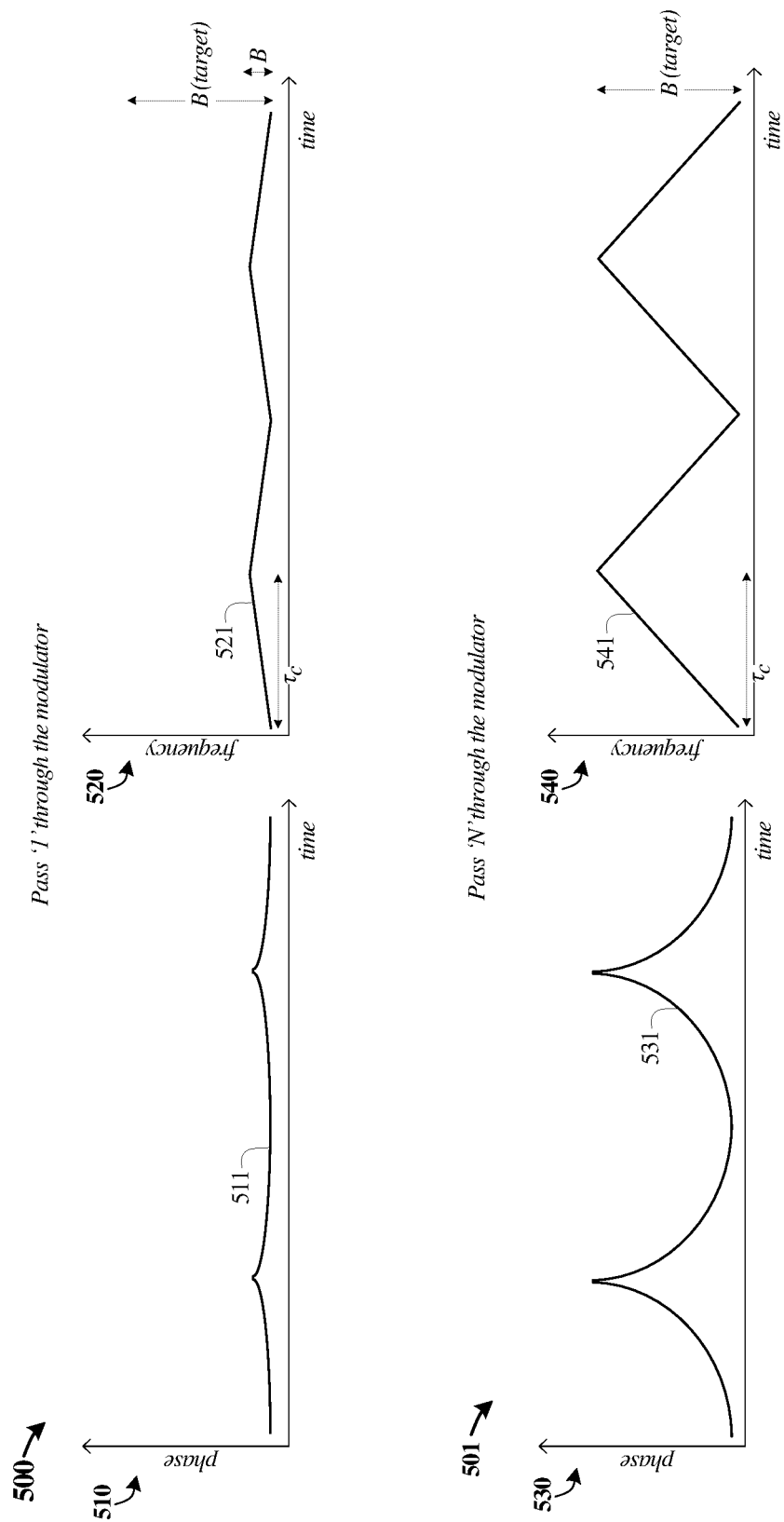
FIG. 5 illustrates waveforms for establishing a modulated signal in an implementation.

Turning first to FIG. 5, signal progression over 'N' iterations within optical loop 410 is shown. Taking a linear chirp pulse as an example waveform, this waveform can be built up over several circulations within optical loop 410. The linear chirp waveforms in this example have a linear variation in frequency over time, and comprise pairs of up-down chirps (increases in frequency, decreases in frequency). Other waveforms can instead be employed using similar techniques.

Optical source 401 can energize a CW optical signal having a particular frequency or wavelength and amplitude into optical loop 410. Modulator 404 can then apply incremental modulations to the optical signal over a quantity of circulations to establish the circulating waveforms that form a composite waveform to attempt to meet a desired waveform specification (e.g., linear chirp). The actual quantity of circulations needed to establish the composite waveform can vary based on the magnitude of incremental modulations feasible by modulator 404, the specified waveform complexity, bandwidth, and associated high-frequency content, and other factors. In one example, the quantity of circulations, N, is N $N \approx \pi B \tau_C / \Delta$, where B is the desired signal bandwidth, $\tau_C$ is the chirp time (in the case of chirp waveforms), and $\Delta$ is an indication of the modulation capability per iteration for the modulator.

Thus, FIG. 5 shows a first iteration in view 500 having graphs 510 and 520. Graph 510 has a horizontal time axis and a vertical phase axis. Graph 510 includes curve 511 that shows phase performance over time for an optical signal. Graph 520 has a horizontal time axis and a vertical frequency axis. Graph 520 includes curve 521 that shows frequency performance over time for an optical signal. A chirp time (TC) is shown as a ramp time for the waveform. Bandwidth 'B' is shown as not yet reaching a target bandwidth in graph 520.

FIG. 5 also shows an 'Nth' iteration in view 501 having graphs 530 and 540. Graph 530 has a horizontal time axis and a vertical phase axis. Graph 530 includes curve 531 that shows phase performance over time for an optical signal. Graph 540 has a horizontal time axis and a vertical frequency axis. Graph 540 includes curve 541 that shows frequency performance over time for an optical signal. A chirp time ($\tau_C$) is shown as a ramp time for the waveform. Bandwidth 'B' is shown as now reaching a target bandwidth in graph 540.

In a specific example, a target bandwidth might be 100 GHz, with a chirp duration of 0.5 µs, and a modulator phase capability of 20 radians. According to the equation above, the number of passes or iterations required to reach the target bandwidth is 7,850. This would require 7.85 milliseconds (ms) to reach steady state for the chirp pairs (up-down).

Figure 6:
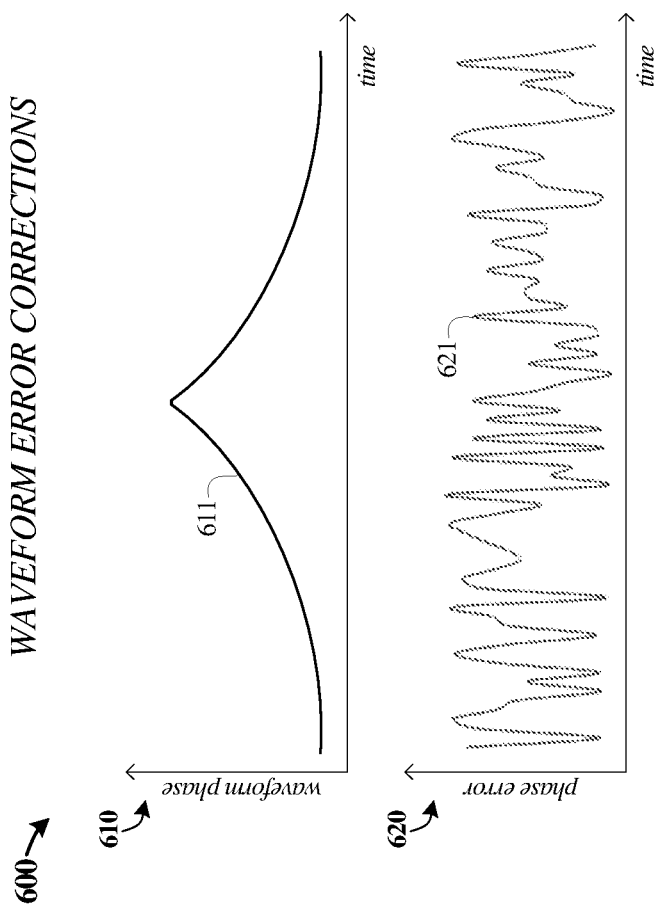
FIG. 6 illustrates waveforms for error correction in an implementation.

FIG. 6 illustrates waveform error correction techniques in view 600 for noise or phase errors measured for a waveform or optical signal. View 600 includes graphs 610 and 620. Graph 610 includes a horizontal time axis and a vertical phase axis. Graph 620 includes a horizontal time axis and a vertical phase error axis. Taking again a linear chirp pulse as an example waveform, a measured waveform phase is shown in graph 610. This measured waveform phase might be measured by error detection unit 454. The measured waveform phase can be compared against a reference phase waveform or desired/target phase to determine curve 621 in graph 620. Curve 621 indicates error in the phase, as compared to the reference phase waveform. To correct these phase errors, the inverse of curve 621 can be applied by modulator 404 to the waveforms circulating in optical loop 410 to subtract out the phase errors. Over time, this operation can keep the waveforms within an error margin. As mentioned above, if skew for the frequency occurs that is outside of the bandwidth of the modulator to correct, then corrections for the skew can be used against the optical sources. For example, corrections can be indicated to a temperature controller for optical source 401 or injected amplifier 402. These additional skew errors are typically slow processes with slow bandwidth, on the order of seconds or minutes. However, the bandwidth for correction is on the order of milliseconds to tens of milliseconds.

Figure 7:
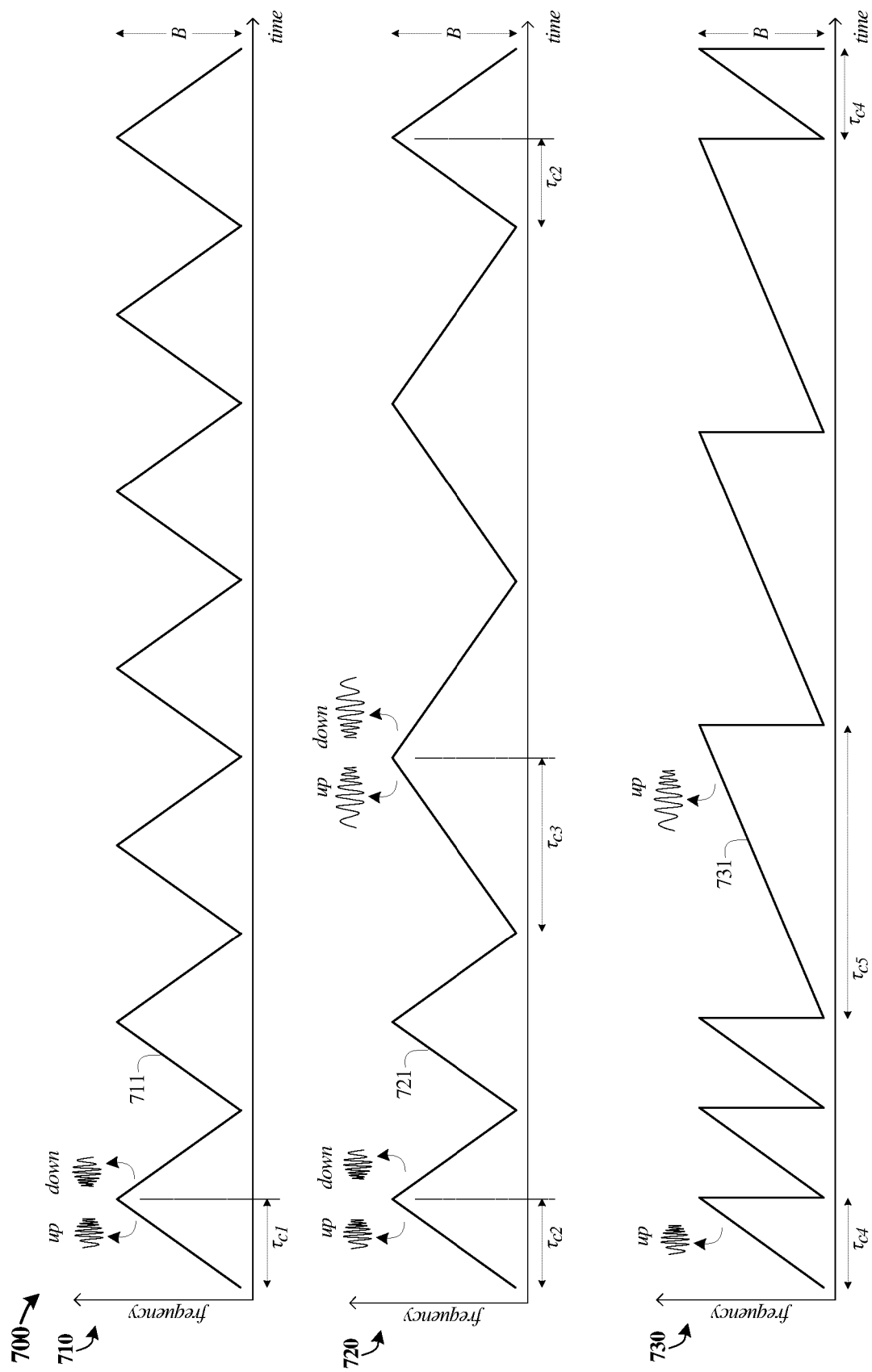
FIG. 7 illustrates waveforms for establishing a modulated signal in an implementation.

FIG. 7 includes view 700 that illustrates three graphs 710, 720, and 730 that each show frequency ramps corresponding to example linear chirp pulses and pulse configurations which might be produced by system 400. The bandwidth of each signal is shown on the right-hands side of the graphs, noted by B, which might be 100 GHz in some examples. Various chirp times ($\tau_{C1}, \tau_{C2}, \tau_{C3}, \tau_{C4}, \tau_{C5}$) are shown for the various waveforms.

Taking graph 710 first, symmetric up-down chirps as a baseline configuration in curve 711. A time-domain representation of the chirps is pictured above the frequency domain representation of curve 711. The chirp time of curve 711 is steady at $\tau_{C1}$. A linear 'up' chirp is produced followed by a linear 'down' chirp, which is repeated over a period of time, thus, a repeating series of waveforms of chirps are produced. These chirps can be used to sense properties of remote or distant objects, such as range/distances.

Graph 720 includes curve 721 that comprises two different linear chirp times ($\tau_{C2}, \tau_{C3}$). A time-domain representation of the chirps is pictured above the frequency domain representation of curve 721. Two linear 'up-down' chirp pairs (each of duration $\tau_{C2}$) are produced followed by two linear 'up-down' chirp pairs (each of duration $\tau_{C3}$), which are repeated over a period of time. The use of two different chirp times can help in discriminating objects at different ranges. For example, reflected chirps can be compared to present chips in optical loop 410, and this comparison can be made to determine receipt delay that corresponds to a range. However, for longer distances, the receipt delay might line up with different ones of the chirp types in curve 721, allowing for discrimination of such distances when ambiguity over 'wrapping' within a symmetric or unchanging repeating waveform is used (such as in graph 710).

Graph 730 includes curve 731 that comprises two different linear chirp times ($\tau_{C4}$, $\tau_{C5}$). A time-domain representation of the chirps is pictured above the frequency domain representation of curve 731. However, curve 731 only includes linear 'up' chirp pulses and omits the linear 'down' chirp pulses. The use of two different chirp times and omitting the symmetric down chirp portions can be useful to ignore doppler effects. Also, as with curve 721, the use of two different chirp times can help in discriminating objects at different ranges. For example, reflected chirps can be compared to present chips in optical loop 410, and this comparison can be made to determine receipt delay that corresponds to a range. However, for longer distances, the receipt delay might line up with different ones of the chirp types in curve 731, allowing for discrimination of such distances when ambiguity over 'wrapping' within a symmetric or unchanging repeating waveform is used (such as in graph 710).

Figure 8:
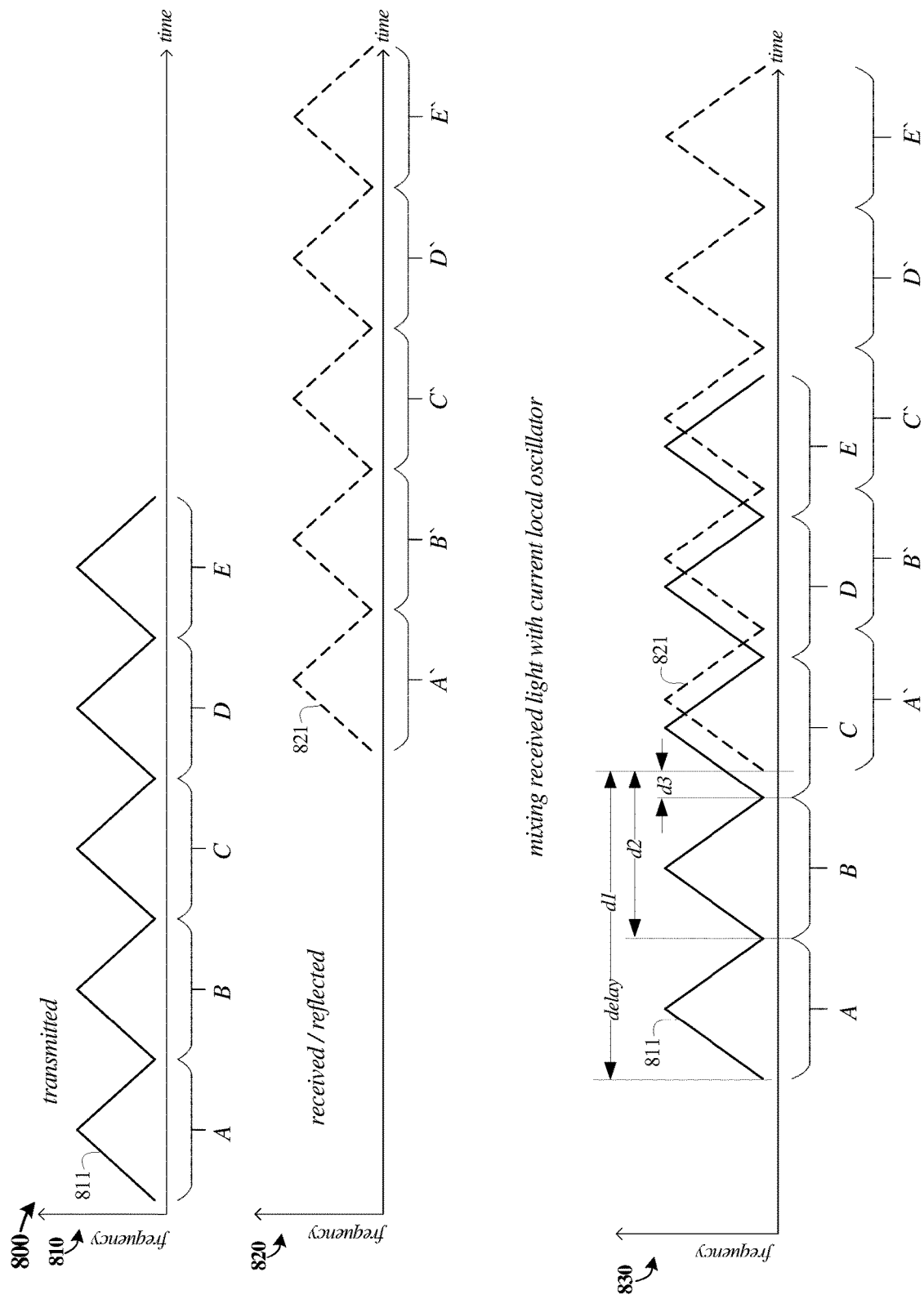
FIG. 8 illustrates sensing waveforms in an implementation.

FIG. 8 includes example waveforms used for ranging and remote sensing applications. The waveforms comprise linear chirps, as seen in FIG. 7. However, the process of determining range is illustrated in FIG. 8 using such waveforms. Although symmetric and repeating linear chirps having the same chirp time are shown, it should be understood that different waveforms and chirp times can instead be employed. View 800 illustrates three graphs 810, 820, and 830 that each show frequency ramps corresponding to example linear chirp pulses and pulse configurations which might be produced by system 400.

Turning first to graph 810, a train or series of five (5) chirp pulse pairs is shown (up-down chirp pairs) in a frequency domain representation, with each chirp pair labeled with a corresponding letter (A-B-C-D-E). These chirp pulse pairs are emitted by a sensing system, such as by optics 425 as optical output 426. The chirp pulse pairs can be reflected by distant objects or targets, and received into a detection system (e.g., detection system 121). However, a delay will have occurred from when emitted to when received due to the distance of the object and the finite speed of light. Graph 820 shows an example received/reflected signal in curve 821 showing the five pulse pairs labeled with a corresponding 'primed' letter (A'B'-C'-D'-E'). Finally, graph 830 shows a comparison of curve 811 and curve 821 superimposed with each other. A delay between the first emitted pulse and the first received pulse is shown, and this delay can correspond to the distance or range to the object.

To produce graph 830, the reflected light received into a detector is mixed with the light in the current optical loop, such as in optical loop 410. A delay difference in the waveforms (to comparable points within the waveforms) can relate to the distance, accounting for the speed of transit (speed of light over twice the distance). However, with longer distances, it may be difficult to discriminate which pulse in the optical loop corresponds to the delay, as the letter labels are not typically employed in real-world circumstances. Thus, when the reflected signal exceeds a single chirp (pair) duration, a 'wrap' condition is encountered which makes it more ambiguous to tell which pulse in the reflected signal corresponds to which pulse in optical loop 410. For instance, three delays might be determined between the received pulse, each delay corresponding to a different distance (d1, d2, d3). This can correspond to a first distance, a first distance plus a single wrap time (second distance), and a first distance plus two wrap times (third distance). As mentioned herein, different chirp ramp times might be employed to allow better discrimination and comparison to eliminate some distance ambiguity for long distances. Alternatively, this condition of ambiguity can be detected, and the waveforms can be altered on a subsequent measurement cycle to account for the longer delay in receiving the reflected pulses, such as longer ramp times.

Normally, a source signal emitted towards a remote object needs to be stored in an optical storage loop for the duration of the return trip, which can be difficult for long echo times to maintain optical coherence in the optical storage loop. However, in the examples herein, the source signals circulating in optical loop 410 are of such high quality due to the incremental modulation approach, recycling, and error corrections, a comparison can be made to the current waveforms in optical loop 410 without having a separate storage loop for each emitted pulse. For the longer distances shown in graph 830, a quantity of 'wraps' can be determined as corresponding to a distance scale applicable to the object, and then ranging can be performed with that range (quantity of wraps) in mind. This can be accomplished by first performing a low resolution ranging measurement to establish a rough estimate or range or scaling, followed by high resolution ranging measurements that take into account that rough delay scaling. The resolutions can correspond to frequency ramp times of the corresponding chirp pulses. For example, low resolution chirp pulses with a low speed frequency ramps can be performed initially to determine distance scaling to the object, and high resolution chirp pulses with high speed frequency ramps can be performed subsequently to determine finer scale measurements of the distance. The initial reflection delay from the low speed frequency ramp measurements can be used to determine how many wraps of the high speed frequency ramps are necessary to then accurately compare the reflected signal to obtain the correct range or distance. It should be noted that instead of calculating a rough estimate of distance to establish wrap times, a guess or educated estimate can be employed based on contextual information, user input, prior measurements, or external sources of distance. Also, multiple chirp times can be employed in a single sequence of chirps, such as seen in graphs 720 and 730. These can allow for larger regions of interest for ranging or having multiple regions of interest fit within the receiver bandwidth.

Figure 9:
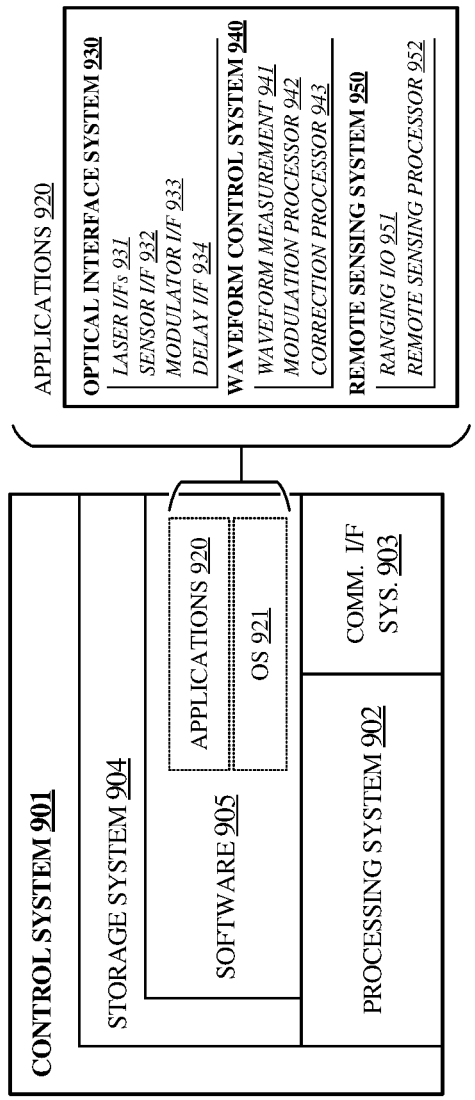
FIG. 9 illustrates a control system for any of the various implementations and operations described herein.

FIG. 9 illustrates control system 900 and associated software 905 in an implementation. Control system 900 is representative of any system or collection of systems in which various control, command, or processing of operational techniques, algorithms, architectures, scenarios, and processes disclosed herein may be implemented. For example, control system 900 can be used to implement portions of control elements or processing elements of FIG. 1, such as portions of sensing node 110, control system 140, and detection system 121. Similarly, control system 900 can implement control, command, or processing elements for system 400, such as waveform controller 480. It should be understood that while executable software elements are described for control system 900, various portions can instead be implemented in circuitry, such as application-specific circuitry, programmable logic devices, discrete circuitry, and other arrangements.

Control system 900 may be implemented as a single apparatus, system, or device or may be implemented in a distributed manner as multiple apparatuses, systems, or devices. Control system 900 includes, but is not limited to, processing system 902, communication interface system 903, storage system 904, and software 905. Processing system 902 is operatively coupled with communication interface system 903 and storage system 904.

Processing system 902 loads and executes software 905 from storage system 904. Software 905 includes applications 920, at least some of which are representative of the operational techniques, algorithms, architectures, scenarios, and processes discussed with respect to the included Figures. When executed by processing system 902 to perform optical system control, optical modulation control, optical error correction control, and remote sensing control, among other services, software 905 directs processing system 902 to operate as described herein for at least the various processes, operational scenarios, and sequences discussed in the foregoing implementations. Control system 900 may optionally include additional devices, features, or functionality not discussed for purposes of brevity.

Processing system 902 may comprise a microprocessor and processing circuitry that retrieves and executes software 905 from storage system 904. Processing system 902 may be implemented within a single processing device but may also be distributed across multiple processing devices or sub-systems that cooperate in executing program instructions. Examples of processing system 902 include general purpose central processing units, application specific processors, programmable logic units, graphics processing units, and logic devices, as well as any other type of processing device and supporting circuitry, combinations, or variations thereof.

Storage system 904 may comprise any tangible computer readable storage media readable by processing system 902 and capable of storing software 905. Storage system 904 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. A computer readable storage media, as discussed herein, does not refer to a propagated signal. In addition to computer readable storage media, in some implementations storage system 904 may also include computer readable communication media over which at least some of software 905 may be communicated internally or externally. Storage system 904 may be implemented as a single storage device but may also be implemented across multiple storage devices or sub-systems co-located or distributed relative to each other. Storage system 904 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions comprising applications 920 and operating system 921 to perform optical system control, optical modulation control, optical error correction control, and remote sensing control, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include applications 920. Software 905 may also comprise firmware or some other form of machine-readable processing instructions executable by processing system 902.

Software 905, when loaded into processing system 902 and executed, may transform a suitable apparatus, system, or device (of which control system 900 is representative) overall from a general-purpose computing system into a special-purpose computing system customized to perform optical system control, optical modulation control, optical error correction control, and remote sensing control, among other services. Indeed, encoding software 905 on storage system 904 may transform the physical structure of storage system 904. The specific transformation of the physical structure may depend on various factors in different implementations of this description. Examples of such factors may include, but are not limited to, the technology used to implement the storage media of storage system 904 and whether the computer-storage media are characterized as primary or secondary storage, as well as other factors. For example, if the computer-readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 920 can include optical interface system 930, waveform control system 940, and remote sensing system 950. Optical interface system 930 includes laser interfaces 931, sensor interfaces 932, modulator interface 933, and delay interface 934. Waveform control system 940 includes waveform measurement 941, modulation processor 942, and correction processor 943. Remote sensing system 950 includes ranging input/output module 951, and remote sensing processor 952.

Turning first to optical interface system 930, laser interfaces 931 communicate with one or more laser devices to control operation of such laser devices. This control can include on/off commands, various functional mode commands, and control over thermal dissipation devices associated with the laser devices. For example, a thermal dissipation device might be coupled to a laser device to alter an operating temperature of the laser device. Laser interfaces 931 can alter an operating temperature of an associated laser device by altering temperature set points for a thermal dissipation device for that laser device. Other parameters of a laser device might be altered, including phase adjustments made directly to the laser device or to optics or delay lines associated with the laser devices. Sensor interfaces 932 communicate with various electro-optical sensing elements throughout a system. These sensing elements can convert optical signals into electrical signals or digital signals which can be monitored by sensor interfaces 932 and provided to waveform control system 940 for making alteration, corrections, or modifications to signals circulating in an optical loop. Example characteristics monitored by the sensing elements include ramp, phase, amplitude, frequency, noise, or other characteristics. Modulator interface 933 communicates with an optical modulator that establishes incremental modulations on a circulating optical signal in an optical loop. As mentioned herein, the modulations can establish various waveforms and corrections thereto. Modulator interface 933 can instruct the modulator which modulations to perform, based on determinations made by waveform control system 940. Delay interface 934 communicates with optical delay elements of an optical loop, such as selectable delay elements, fiber loops, delay lines, delay materials, and other elements. Delay interface 934 can instruct such delay elements to alter delays of signals circulating in an optical loop in accordance with instructions determined by waveform control system 940.

Although not pictured optical interface system 930 can also communicate with various optical or optics elements of a remote sensing node, such as elements found in optics 111 of FIG. 1. This can provide control of the various optical devices and optic elements, which may include controlling orientation, pointing, tilt, motor elements, gyroscopic elements, lens/mirror elements, light sensing elements, pointing assistance elements, or other elements associated with beam shapers or optical emission and collection devices. Optical interface system 930 can include telemetry or monitoring elements that provide capture and storage of present states of various elements of an optical system, such as environmental or ambient conditions (temperature, humidity, vibrational states), optic pointing status, optic operational health status, beam operational status, satellite or vehicle positioning, orbital status, or other telemetry.

Next, waveform control system 940 includes various elements that can determine incremental modulations for an optical signal, as well as corrections to such signals. Modulation processor 942 determines incremental modulations for waveforms circulating in an optical loop. These incremental modulations can be determined based on an input/target waveform configuration received over a user interface or from remote sensing system 950. These incremental modulations can also be determined from feedback characteristics measured by sensing elements associated with the optical loop and provided to modulation processor 942 via sensor interfaces 932. For example, waveform measurement 941 receives indications from sensor interface 932 to determine a current state of waveform characteristics among a presently circulating signal in an optical loop. From these characteristics, corrections processor 943 can determine one or more incremental modulations or one or more corrections or adjustments to alter the incremental modulations or determine new incremental modulations to correct various errors in waveforms. Some errors can be adjusted by altering delays among waveforms or phase properties of the waveforms, and corrections processor 943 can communicate with delay interface 934 or laser interfaces 931 to perform such adjustments.

Finally, remote sensing system 950 controls and coordinates remote sensing activities performed by a remote sensing node or device that includes control system 901. Ranging input/output module 951 interfaces remote sensing data or ranging data with external systems or on-board systems to report results of remote sensing operations. Ranging input/output module 951 might receive commands to begin remote sensing operations, coordinates or locations of remote regions, objects, or targets upon which to perform remote sensing operations, and can exchange various status or telemetry of present remote sensing operations to external systems. Ranging input/output module 951 might receive indications of positioning, pointing, orbital ephemeris, or other indications to alter a positioning, orientation, or aiming of various optical or vehicle elements discussed herein. Ranging input/output module 951 can receive digital data from external systems over network interfaces, RF interfaces, optical interfaces, or digital data from local storage devices. Ranging input/output module 951 can also packetize or frame data as-needed and enact various handshaking, communication protocols, retransfers, header/footer processing, and other various data and communication functions for communication channels, which can include satellite-to-ground or air communications, satellite-to-satellite communications, and other communication topologies. Ranging input/output module 951 can provide data interfaces, such as APIs, sockets, network stacks, and other similar elements for components of applications 920.

Remote sensing processor 952 takes as input indications of reflected waveforms that have been received at a sensing node and processes these indications of reflected waveforms to determine various properties of a target object, remote object(s), or region(s) of interest. In some examples, remote sensing processor 952 compares properties of the reflected signals against currently circulating signals in an optical loop originally used to generate the reflected signals. In other examples, remote sensing processor 952 can directly compute properties of the targets using the reflected signal and other information such as time elapsed since emission of the reflected signal from the sensing node, or other data or metadata. Remote sensing processor 952 can determine modifications to the waveforms used for remote sensing, such as when to apply different waveform ramps or different waveforms entirely. This can be useful when the ranging results are ambiguous, include too much clutter objects, or the range itself needs adjustment to properly detect targets closer or farther than an original waveform supports. Remote sensing processor 952 can indicate changes to waveforms to waveform control system 940 which then modifies incremental adjustments or target waveform properties accordingly.

Communication interface system 903 may include communication elements and circuitry that allow for communication with various elements under the control of control system 900, external systems, computing systems, or electrical components over communication links or communication networks. Communication interface system 903 may communicate over various communication mediums to exchange communications with other computing systems or networks of systems, such as conductors, waveguides, air, free space, or any other suitable communication mediums. Physical or logical elements of communication interface system 903 can receive input from users or other operators.

Communication between control system 900 and other elements or systems over communication interface system 903 may occur using data links, control links, communication links, or communication networks and in accordance with various communication protocols, combinations of protocols, or variations thereof. For example, control system 900 when implementing a control device, might communicate with external circuitry or optical handling elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example network topologies include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet Protocol (IP), the transmission control protocol (TCP), and the user datagram protocol (UDP), as well as any other suitable communication protocol, variation, or combination thereof. Communication interface system 903 may include circuitry to handle the aforementioned interfacing and links, such as transmitters/receivers, transceivers, network interface controllers, antennas, power amplifiers, RF circuitry, digital interfaces, optoelectronic circuitry, and other communication circuitry.

Communication interface system 903 may include a software or virtual interface such as a terminal interface, command line interface, or application programming interface (API). Communication interface system 903 may also include physical user interfaces, such as keyboard, a mouse, a voice input device, or a touchscreen input device for receiving input from a user. Communication interface system 903 may include visualization interfaces, user command controls, and telemetry, such as user controls, start/stop controls, operating mode control interfaces, status interfaces, and system characteristic calibration controls, among others. Output devices such as displays, speakers, web interfaces, terminal interfaces, and other types of output devices may also be included in communication interface system 903. In network interface examples, communication interface system 903 might packetize data for receipt by a display system or computing system coupled over one or more network interfaces. Communication interface system 903 may comprise API elements for interfacing with users, other data systems, other user devices, web interfaces, and the like. Communication interface system 903 may also include associated user interface software executable by processing system 902 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and arrangements discussed herein are employed according to the descriptions above. However, it should be understood that the disclosures and enhancements herein are not limited to these materials and arrangements, and can be applicable across a range of suitable materials and arrangements. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:
   an optical source configured to provide an optical signal for circulation in an optical loop;
   an optical amplification element configured to maintain at least a minimum target amplitude of the optical signal during circulation in the optical loop;
   a modulator element configured to apply incremental modulations to the optical signal over a quantity of circulations to establish circulating waveforms that form a composite waveform; and
   error detection elements configured to monitor the circulating waveforms;
   wherein at least a portion of detected errors are corrected by the modulator element during the incremental modulations; and
   wherein a range to a remote target is determined based at least in part on detection of the composite waveform after at least partial reflection by the remote target and comparison with a present configuration of the composite waveform circulating in the optical loop.

2. The apparatus of claim 1, comprising:
   a delay element configured to adjust alignment among the circulating waveforms to overlay at least a portion of the circulating waveforms to form the composite waveform.

3. The apparatus of claim 1, wherein the composite waveform comprises a repeating linear chirp sequence.

4. The apparatus of claim 1, wherein the optical amplification element comprises an injected diode laser.

5. The apparatus of claim 1, wherein the error detection elements comprise:
   a ramp detection element configured to measure ramp errors among the circulating waveforms; and
   an error correction element configured to determine ramp corrections based on the ramp errors and direct the modulator element to include the ramp corrections in the incremental modulations.

6. The apparatus of claim 5, wherein the error detection elements comprise:
   a noise detection element configured to measure noise errors among the circulating waveforms; and
   the noise correction element configured to determine noise corrections based on the noise errors and direct the modulator element to include the noise corrections in the incremental modulations.

7. The apparatus of claim 5, wherein the error detection elements comprise:

a phase and frequency detection element configured to measure phase errors and frequency errors among the circulating waveforms;

the error correction element configured to determine phase corrections and frequency corrections based on the phase errors and frequency errors, direct the modulator element to include the frequency corrections in the incremental modulations, and direct a delay element configured to adjust alignment among the circulating waveforms to apply the phase corrections.

8. The apparatus of claim 7, wherein based on the phase errors exceeding a threshold level, the error correction element is configured to direct operating temperature adjustments for the optical amplification element to bring the phase errors under the threshold level.

9. The apparatus of claim 1, wherein the error detection elements comprise:
electro-optical elements configured to convert an indication of the optical signals in an optical domain to an indication of the optical signals in an electrical domain;
control circuitry configured to monitor the detected errors in the electrical domain and determine error corrections that control the modulator element to influence the circulating waveforms in the optical domain.

10. The apparatus of claim 1, comprising:
an output arrangement configured to receive at least a portion of the optical signal comprising the composite waveform for emission toward the remote target.

11. The apparatus of claim 1, comprising:
responsive to an estimated range to the remote target exceeding a range threshold, the modulator element configured to apply the incremental modulations such that more than one different composite waveform is circulating in the optical loop; and
wherein the range to the remote target is determined based at least in part on a detection of the more than one composite waveform after at least partial reflection by the remote target, a determination of which among the more than one composite waveform is detected, and a comparison with a present configuration of the more than one composite waveform circulating in the optical loop.

12. A method, comprising:
providing an optical signal for circulation in an optical loop;
applying incremental modulations to the optical signal over a quantity of circulations to establish circulating waveforms that form a composite waveform; and
correcting at least a portion of errors in the circulating waveforms during the incremental modulations;
wherein a range to a remote target is determined based at least in part on detection of the composite waveform after at least partial reflection by the remote target and comparison with a present configuration of the composite waveform circulating in the optical loop.

13. The method of claim 12, comprising:
adjusting alignment among the circulating waveforms to overlay at least a portion of the circulating waveforms to form the composite waveform.

14. The method of claim 12, wherein the composite waveform comprises a repeating linear chirp sequence.

15. The method of claim 12, wherein the errors among the circulating waveforms comprise at least one among ramp errors, noise errors, frequency errors, and phase errors; and comprising:
determining waveform corrections based on the ramp errors, the noise errors, and the frequency errors and including at least a portion of the waveform corrections in the incremental modulations; and
determining phase corrections based on the phase errors and including at least a portion of the phase corrections in delays applied to the circulating waveforms.

16. The method of claim 15, comprising:
based on the phase errors exceeding a threshold level, adjusting an operating temperature for an optical amplification element in the optical loop to bring the phase errors under the threshold level.

17. The method of claim 12, comprising:
directing at least a portion of the optical signal comprising the composite waveform for emission toward the remote target.

18. The method of claim 12, comprising:
responsive to an estimated range to the remote target exceeding a range threshold, establishing the incremental modulations such that more than one different composite waveform is circulating in the optical loop; and
wherein the range to the remote target is determined based at least in part on a detection of the more than one composite waveform after at least partial reflection by the remote target, a determination of which among the more than one composite waveform is detected, and a comparison with a present configuration of the more than one composite waveform circulating in the optical loop.

19. A control system, comprising:
an input module configured to receive an indication of a waveform for generation;
a modulation controller configured to determine incremental modulations applied to an optical signal over a quantity of circulations in an optical loop to establish the waveform;
the modulation controller configured to receive indications of errors in the optical signal and determine corrections for the incremental modulations based on the errors; and
the modulation controller configured to instruct an optical modulator to establish the waveform over the quantity of circulations based on the incremental modulations and the corrections;
wherein a range to a remote target is determined based at least in part on detection of the waveform after at least partial reflection by the remote target and comparison with a present configuration of the waveform circulating in the optical loop.

20. The control system of claim 19, comprising:
an output module configured to determine that the waveform has been established in the optical loop, and instruct output optics to direct at least a portion of the optical signal comprising the waveform for emission toward the remote target.

* * * * *